(12) United States Patent
Wu et al.

(10) Patent No.: US 11,858,739 B2
(45) Date of Patent: Jan. 2, 2024

(54) HONEYCOMB SYSTEM AND MATERIAL BOX STORAGE AND SORTING SYSTEM

(71) Applicant: BLUESWORD INTELLIGENT TECHNOLOGY CO., LTD., Shandong (CN)

(72) Inventors: Yaohua Wu, Shandong (CN); Xiaoyi Zhang, Shandong (CN); Xia Jiang, Shandong (CN); Yigong Zhang, Shandong (CN)

(73) Assignee: BLUESWORD INTELLIGENT TECHNOLOGY CO., LTD., Shandong (CN)

( * ) Notice: Subject to any disclaimer, the term of this patent is extended or adjusted under 35 U.S.C. 154(b) by 948 days.

(21) Appl. No.: 16/652,077

(22) PCT Filed: Sep. 29, 2018

(86) PCT No.: PCT/CN2018/108578
§ 371 (c)(1),
(2) Date: Jul. 20, 2020

(87) PCT Pub. No.: WO2019/062893
PCT Pub. Date: Apr. 4, 2019

(65) Prior Publication Data
US 2021/0016967 A1    Jan. 21, 2021

(30) Foreign Application Priority Data
Sep. 30, 2017  (CN) .......................... 201710916617.1

(51) Int. Cl.
*B65G 1/04*   (2006.01)
*B65G 1/137*  (2006.01)
(Continued)

(52) U.S. Cl.
CPC ......... *B65G 1/0492* (2013.01); *B65G 1/1371* (2013.01); *B65G 1/1373* (2013.01);
(Continued)

(58) Field of Classification Search
CPC .. B65G 1/0492; B65G 1/1371; B65G 1/1373; B65G 2209/02; B66F 9/063; B66F 11/04;
(Continued)

(56) References Cited

U.S. PATENT DOCUMENTS

| 10,138,060 B1 * | 11/2018 | Mantha | ................ B65G 1/1371 |
| 2013/0103248 A1 * | 4/2013 | Ogawa | ................ B65G 1/0492 |
| | | | 701/23 |

(Continued)

FOREIGN PATENT DOCUMENTS

| JP | 2010235214 | 10/2010 |
| WO | 2010026633 | 3/2010 |
| WO | 2013046379 | 4/2013 |

OTHER PUBLICATIONS

"Office Action of Japan Counterpart Application", dated May 11, 2021, pp. 1-6.

*Primary Examiner* — Kyle O Logan
(74) *Attorney, Agent, or Firm* — JCIP GLOBAL INC.

(57) ABSTRACT

A honeycomb system includes at least one modular storage unit. The modular storage unit comprises a set of dual-goods-location shelves, at least one lifting machine, at least one shuttle vehicle and at least one power station. The set of dual-goods-location shelves are parallel to each other to form a roadway where the shuttle vehicle operates. The power station is arranged at two ends or in a middle portion of the dual-goods-location shelves and is integrated with a transmission mechanism and a support frame. The transmission mechanism is connected to the shuttle vehicle and the lifting machine to perform goods transfer therebetween.

15 Claims, 10 Drawing Sheets

(51) Int. Cl.
  *B66F 9/06* (2006.01)
  *B66F 11/04* (2006.01)
  *G06Q 10/0631* (2023.01)
  *G06Q 10/087* (2023.01)
  *G06Q 10/20* (2023.01)
  *G06K 7/14* (2006.01)

(52) U.S. Cl.
  CPC .............. *B66F 9/063* (2013.01); *B66F 11/04* (2013.01); *G06Q 10/06315* (2013.01); *G06Q 10/087* (2013.01); *G06Q 10/20* (2013.01); *B65G 2209/02* (2013.01); *G06K 7/1413* (2013.01)

(58) Field of Classification Search
  CPC ........... G06Q 10/06315; G06Q 60/087; G06Q 10/20; G06K 7/1413
  See application file for complete search history.

(56) References Cited

U.S. PATENT DOCUMENTS

| | | | |
|---|---|---|---|
| 2016/0130086 A1* | 5/2016 | Yamashita | B65G 1/1373 414/807 |
| 2017/0137270 A1* | 5/2017 | Shugen | B65G 1/04 |
| 2017/0152106 A1* | 6/2017 | Hofmann | B65G 1/1378 |
| 2017/0158430 A1* | 6/2017 | Raizer | B65G 1/065 |
| 2017/0203921 A1* | 7/2017 | Issing | B65G 1/0407 |
| 2017/0267452 A1* | 9/2017 | Goren | B65G 1/0492 |
| 2017/0313514 A1* | 11/2017 | Lert, Jr. | B65G 1/0478 |
| 2019/0164795 A1* | 5/2019 | Motoori | H01L 21/67769 |

* cited by examiner

HONEYCOMB SYSTEM AND MATERIAL BOX STORAGE AND SORTING SYSTEM

CROSS-REFERENCE TO RELATED APPLICATION

This application is a 371 of international application of PCT application serial no. PCT/CN2018/108578, filed on Sep. 29, 2018, which claims the priority benefit of China application no. 201710916617.1, filed on Sep. 30, 2017. The entirety of each of the above mentioned patent applications is hereby incorporated by reference herein and made a part of this specification.

BACKGROUND

Technical Field

This application relates to the technical field of storage, in particular to a honeycomb system and a material box storage and sorting system.

Description of Related Art

The highly-socialized, professional and centralized modern industrial production has put forward the requirements for timely, rapid and accurate supply and allocation of goods and promotes the rapid development of stereoscopic warehouse technologies. With the continuous development of warehousing, storage shelves, as one of the essential facilities for storage, have been applied to more and more industries and enterprises and have become an indispensable part of modern industrial warehouses, logistics centers and delivery centers. However, existing storage shelves have the problems of low delivery and storage efficiency and large space occupation.

An effective solution to the problems of low delivery and storage efficiency and large space occupation of the existing storage shelves is not available yet at present.

SUMMARY

In view of this, the objective of this application is to provide a honeycomb system and material box storage and sorting system, which at least can improve the delivery and storage efficiency and storage density of shelves and save an occupied space.

In the first aspect, an embodiment of this application provides a honeycomb system which is applied to a storage and sorting system and comprises at least one modular storage unit. A plurality of the modular storage units correspond to a sorting apparatus. The modular storage unit comprises a set of dual-goods-location shelves, at least one lifting machine, at least one shuttle vehicle and at least one power station. The set of dual-goods-location shelves are parallel to one another to form a roadway where the shuttle vehicle operates, and the power station is arranged at two ends of the dual-goods-location shelves or in a middle portion of the dual-goods-location shelves and is integrated with a transmission mechanism and a support frame. The transmission mechanism is connected to the shuttle vehicle and the lifting machine to perform goods transfer between the shuttle vehicle and the lifting machine.

On the basis of the first aspect, an embodiment of this application provides a first feasible implementation of the honeycomb system, wherein the shuttle vehicle is a bidirectional-stretching and single-goods-location shuttle vehicle or a bidirectional-stretching and dual-goods-location shuttle vehicle. The bidirectional-stretching and single-goods-location shuttle vehicle comprises a single-goods-location storage platform and a fork. The bidirectional-stretching and dual-goods-location shuttle vehicle comprises a dual-goods-location storage platform and a fork. The forks are bidirectional-stretching forks.

On the basis of the first aspect, an embodiment of this application provides a second feasible implementation of the honeycomb system, wherein the honeycomb system further comprises a layer-change lifting machine which is arranged at any end of the dual-goods-location shelves.

On the basis of the first aspect, an embodiment of this application provides a third feasible implementation of the honeycomb system, wherein the power station has a storage region and a cache region. The transmission mechanism comprises a plurality of transmission rollers or a plurality of belts. The transmission rollers in the storage region are smooth transmission rollers, and the transmission rollers in the cache region are coarse transmission rollers.

On the basis of the third feasible implementation, an embodiment of this application provides a fourth feasible implementation of the honeycomb system, wherein the power station further comprises a transition board which is arranged between the storage region and a rail beam of the shuttle vehicle.

On the basis of the first aspect, an embodiment of this application provides a fifth feasible implementation of the honeycomb system, wherein the dual-goods-location shelves are intensive multi-layer shuttle vehicle shelves, and each shelf layer has a plurality of goods locations. The dual-goods-location shelf comprises at least one column sheet, a plurality of material box support rods, a rail beam and a rear beam. The rail beam is configured to support the shuttle vehicle to travel thereon. The rail beam and the rear beam are respectively arranged at two ends of the material box support rods. The material box support rods are arranged in parallel to form one shelf layer together with the rail beam and the rear beam. The intensive multi-layer shuttle vehicle shelf includes a plurality of the shelf layers.

On the basis of the first aspect, an embodiment of this application provides a sixth feasible implementation of the honeycomb system, wherein the honeycomb system further comprises a maintenance device corresponding to the at least one modular storage unit.

On the basis of the sixth feasible implementation, an embodiment of this application provides a seventh feasible implementation of the honeycomb system, wherein the maintenance device comprises a multi-layer maintenance platform and a maintenance lifting machine. The multi-layer maintenance platform comprises a first footboard arranged in the roadway and a second footboard arranged at one end of the dual-goods-location shelves. The maintenance lifting machine is connected to the second footboard.

On the basis of the sixth feasible implementation, an embodiment of this application provides a fifth feasible implementation of the honeycomb system, wherein the maintenance device further comprises a maintenance staircase.

In the second aspect, an embodiment of this application further provides a material box storage and sorting system which comprises the honeycomb system provided in the first aspect and any one of the feasible implementations thereof, a batch-of-orders sorting module, an order box goods collection cache module, an order box allocation module and a warehouse management module. The batch-of-orders sorting module is configured to perform parallel sorting of a batch of orders, so as to pick up goods into order boxes from the honeycomb system, and the batch of orders consists of a plurality of user orders. The order box goods collection cache module is configured to cache and transfer the order boxes. The order box allocation module is configured to receive the order boxes cached and transferred by the order box goods collection cache module and to allocate the order boxes according to information of the user orders, so as to complete goods sorting for the batch of orders. The warehouse management module is configured to receive and process the batch of orders sent from an order system, to deploy the honeycomb system to deliver or store the material boxes, to deploy the batch-of-orders sorting module to perform sorting, to deploy the order box goods collection cache module to cache and transfer the order boxes, and to deploy the order box allocation module to allocate the order boxes.

The embodiments of this application at least fulfill the following beneficial effects.

The honeycomb system and the material box storage and sorting system provided by the embodiments of this application adopt intensive multi-layer shuttle vehicle shelves and comprises at least one modular storage unit which includes a set of dual-goods-location shelves, at least one lifting machine, at least one shuttle vehicle and at least one power station. Through the cooperation of the shuttle vehicle, the lifting machine and the power station, the delivery and storage efficiency and storage density of the shelves are improved, an occupied space is saved, and the sorting efficiency of the storage shelves is improved accordingly.

Other characteristics and advantages of this disclosure will be stated in the following description. Or, part of the characteristics and advantages of this disclosure can be inferred or undoubtedly learned from the description or be acquired by implementing the aforementioned technique of this disclosure.

To make the aforesaid objective, characteristics and advantages of this disclosure clearer and easier to understand, preferred embodiments are elaborated below in combination with the accompanying drawings.

BRIEF DESCRIPTION OF THE DRAWINGS

To explicitly explain the specific implementations of this application or the technical solutions of the prior art, the drawings required for description of the specific implementations or the prior art are brief introduced below. Clearly, the accompanying drawings in the following description only illustrate some implementations of this application, and those ordinarily skilled in the art can obtain other drawings according to the following ones without creative labor.

DESCRIPTION OF THE EMBODIMENTS

To make the objective, technical solutions and advantages of the embodiments of this application clearer, the technical solutions of this application are explicitly and thoroughly described below in combination with the accompanying drawings. Clearly, the embodiments in the following description are only illustrative ones, and not all possible ones of this application. On the basis of these illustrative ones, all other embodiments obtained by those ordinarily skilled in the art without creative labor should also fall within the protection scope of the invention.

To solve the problems of low delivery and storage efficiency and large space occupation of existing storage shelves, the embodiments of this application provide a honeycomb system and a material box storage and sorting system, which can improve the delivery and storage efficiency and storage density of shelves and save an occupied space.

To facilitate the understanding of the embodiments of this application, the honeycomb system disclosed by the embodiments of this application is detailed first.

Embodiment 1

Embodiment 1 of this application provides a honeycomb system which is applied to a storage and sorting system. The honeycomb system comprises at least one modular storage unit, wherein a plurality of the modular storage units correspond to a sorting apparatus. The modular storage unit comprises a set of dual-goods-location shelves, at least one lifting machine, at least one shuttle vehicle and at least one power station.

The set of the dual-goods-location shelves are parallel to one another to form a roadway where the shuttle vehicle operates therein. The power station is arranged at two ends or in a middle portion of the dual-goods-location shelves and is integrated with a transmission mechanism and a support frame. The transmission mechanism is connected to the shuttle vehicle and the lifting machine to perform goods transfer between the shuttle vehicle and the lifting machine.

Figure 1:
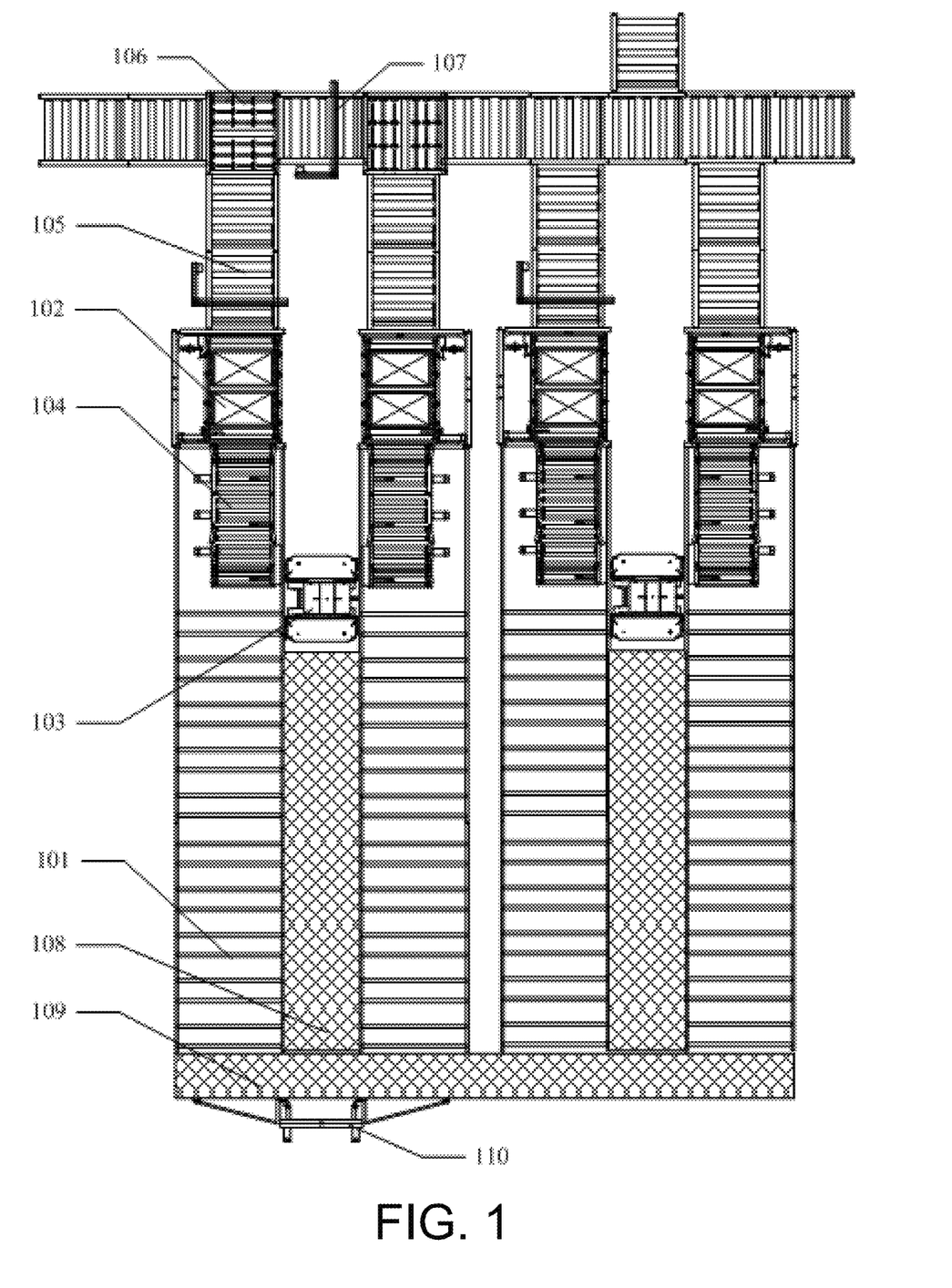
FIG. 1 is a structural diagram of a honeycomb system in an embodiment of this application.

Referring to FIG. 1 which shows a structural diagram of the honeycomb system, the honeycomb system comprises two modular storage units by way of example. In actual use, more modular storage units can be flexibly configured to increase the cache space. The two modular storage units correspond to a sorting apparatus which may comprise a plurality of sorting stations. For example, the modular storage unit comprises a set of dual-goods-location shelves 101, two lifting machines 102, a shuttle vehicle 103 and two power stations 104. An input terminal and an output terminal of the modular storage unit are connected to a conveyor line 105 and a transfer machine 106. Furthermore, the honeycomb system further comprises a code scanner 107 used to scan bar code information on side faces of material boxes to realize entry of information about the material boxes.

Figure 2:
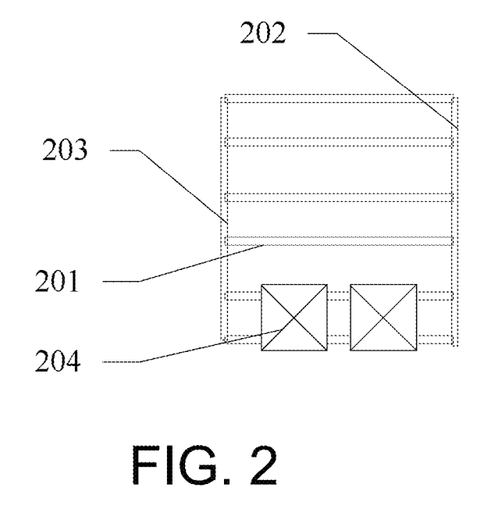
FIG. 2 is a plan view of dual-goods-location shelves of the honeycomb system in the embodiment of this application.

The dual-goods-location shelf is an intensive multi-layer shuttle vehicle shelf. Referring to FIG. 2 which shows a plan view of the dual-goods-location shelves of the honeycomb system and illustrates one shelf layer of the dual-goods-location shelves, the dual-goods-location shelf comprises a plurality of material box support rods 201, a rail beam 202 and a rear beam 203, wherein every two material box support rods 201 define a goods compartment used for supporting order boxes 204. The rail beam 202 supports the shuttle vehicle to travel thereon, and the shuttle vehicle operates in a roadway formed by a set of order box storage and picking shelves which are parallel to one another. The rail beam 202 and the rear beam 203 are respectively arranged at two ends of the material box support rods 201. The plurality of material box support rods are arranged in parallel to form one shelf layer together with the rail beam and the rear beam.

The dual-goods-location shelf is an intensive multi-layer shuttle vehicle shelf, and each shelf layer has a plurality of goods locations. The dual-goods-location shelf comprises at least one column sheet, a plurality of material box support rods, a rail beam and a rear beam. The shuttle vehicle travels on the rail beam. The rail beam and the rear beam are respectively arranged at two ends of the material box support rods. The plurality of material box support rods are arranged in parallel to form one shelf layer together with the rail beam and the rear beam. The intensive multi-layer shuttle vehicle shelf comprises a plurality of shelf layers.

The support parts of the multi-layer shuttle vehicle shelf are not limited to the material box support rods and can also be formed in other ways, such as support plates (steel plates or aluminum alloy plates), support nets, and densely-distributed support rods that can adapt to material boxes with different sizes or directly support goods.

In this embodiment, the dual-goods-location shelves are shelves with double goods-locations. The shuttle vehicle is a bidirectional-stretching and single-goods-location shuttle vehicle, and the dual-goods-location shelves are matched with the bidirectional-stretching and single-goods-location shuttle vehicle. The dual-goods-location shelves have a higher storage density in unit space than single-goods-location shelves, and the bidirectional-stretching and single-goods-location shuttle vehicle occupies a narrower space than a dual-goods-location shuttle vehicle, so that the storage density is improved. Particularly, the bidirectional-stretching and single-goods-location shuttle vehicle comprises a single-goods-location storage platform and a fork, wherein the fork is a bidirectional-stretching fork. In one implementation, a bidirectional-stretching and dual-goods-location shuttle vehicle comprising a dual-goods-location storage platform and a fork may be adopted, wherein the fork is also a bidirectional-stretching fork. An order box storage and picking shelf comprises a plurality of shelf layers, so that the vertical space can be fully used for storing material boxes, and the storage capacity of the storage system is improved.

The two lifting machines 102 shown in FIG. 1 include a storage lifting machine and a delivery lifting machine. The storage lifting machine and the delivery lifting machine are respectively arranged at two ends of the order box storage and picking shelf (namely the upper end and the lower end in FIG. 1). The lifting machines are connected to a batch-of-orders sorting module through the conveyor line 105 and the transfer machine 106.

Figure 3:
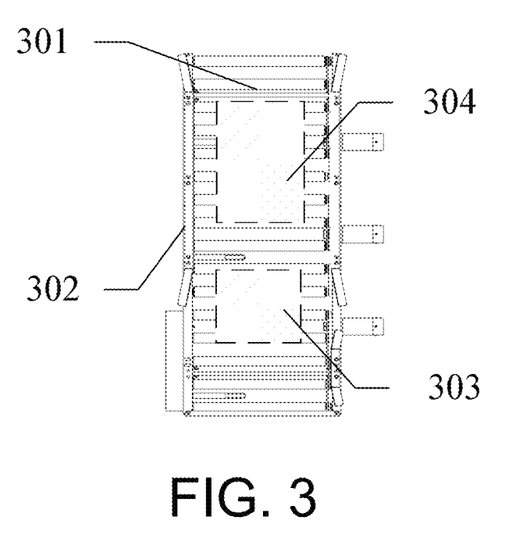
FIG. 3 is a structural diagram of a power station of the honeycomb system in the embodiment of this application.

Particularly, the power stations are arranged at two ends of the dual-goods-location shelves. Referring to FIG. 3 which shows a structural diagram of the power station of the honeycomb system, the power station is integrated with a transmission mechanism 301 and a support frame 302. The transmission mechanism is connected to the shuttle vehicle and the lifting machines to perform goods transfer between the shuttle vehicle and the lifting machines, and then goods are transferred to the conveyor line by the lifting machines.

Figure 4:
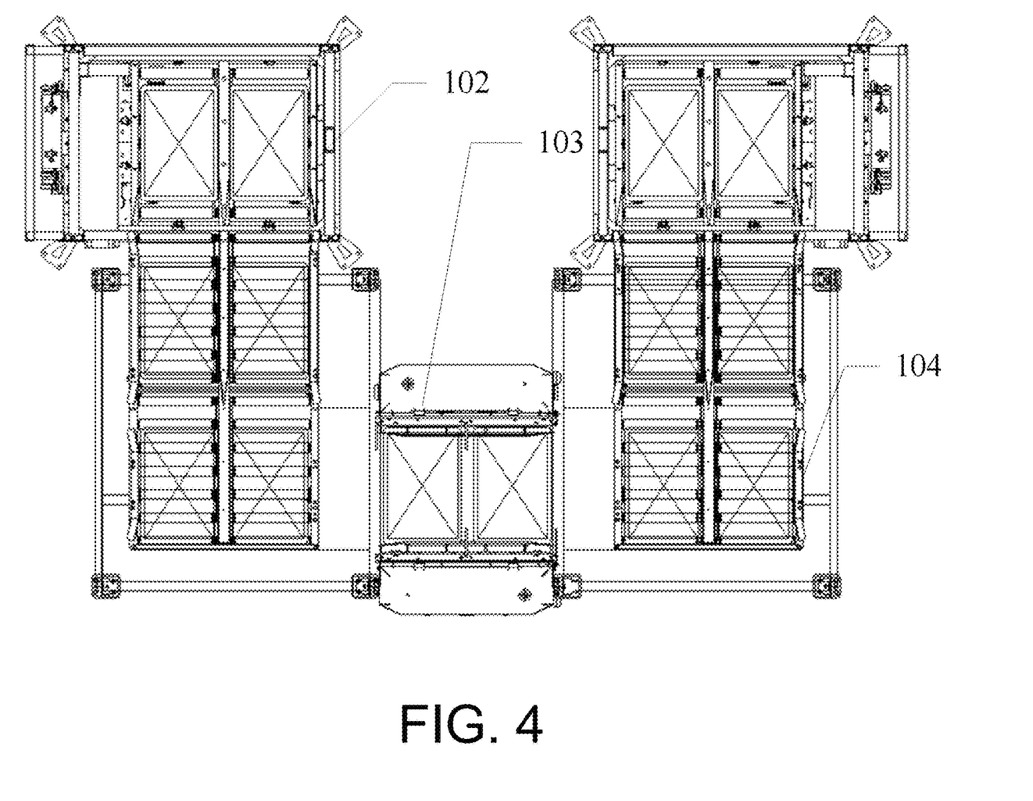
FIG. 4 is a schematic diagram of goods locations of lifting machines and power stations in the embodiment of this application.
Figure 5:
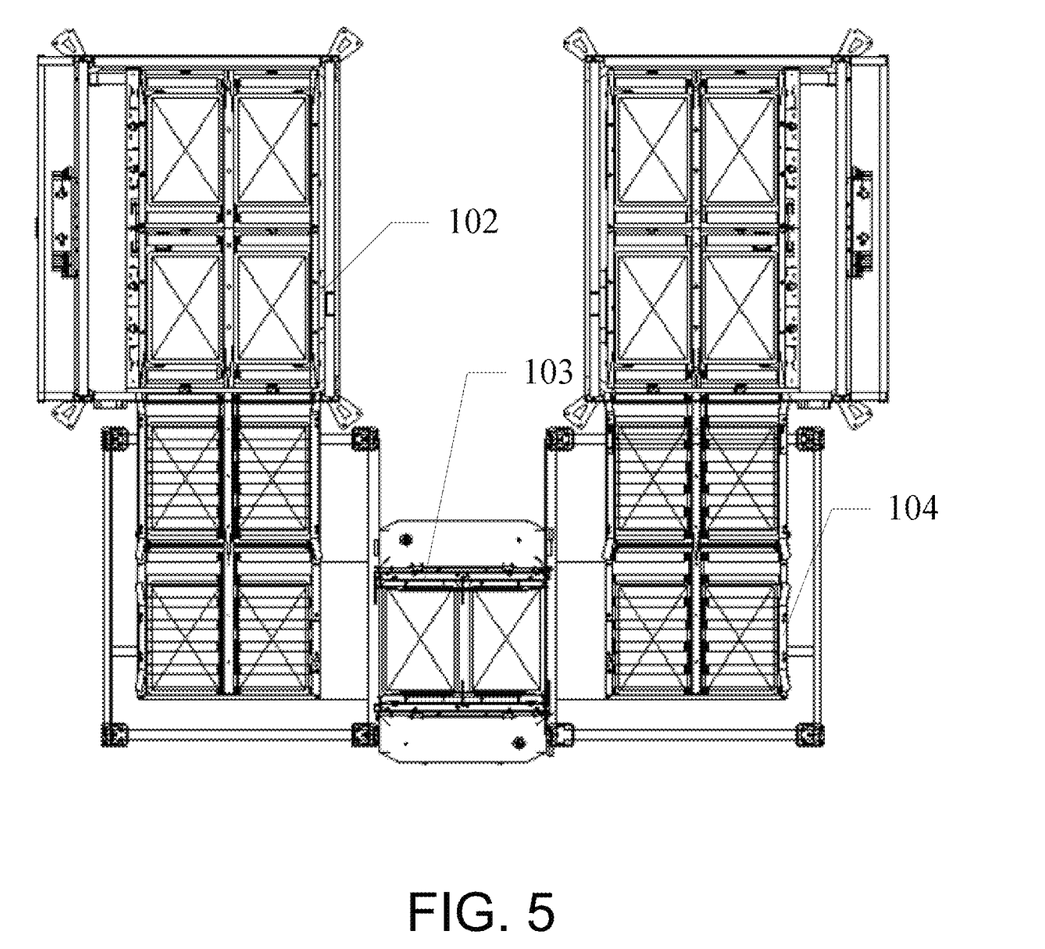
FIG. 5 is another schematic diagram of goods locations of the lifting machines and the power stations in the embodiment of this application.
Figure 6:
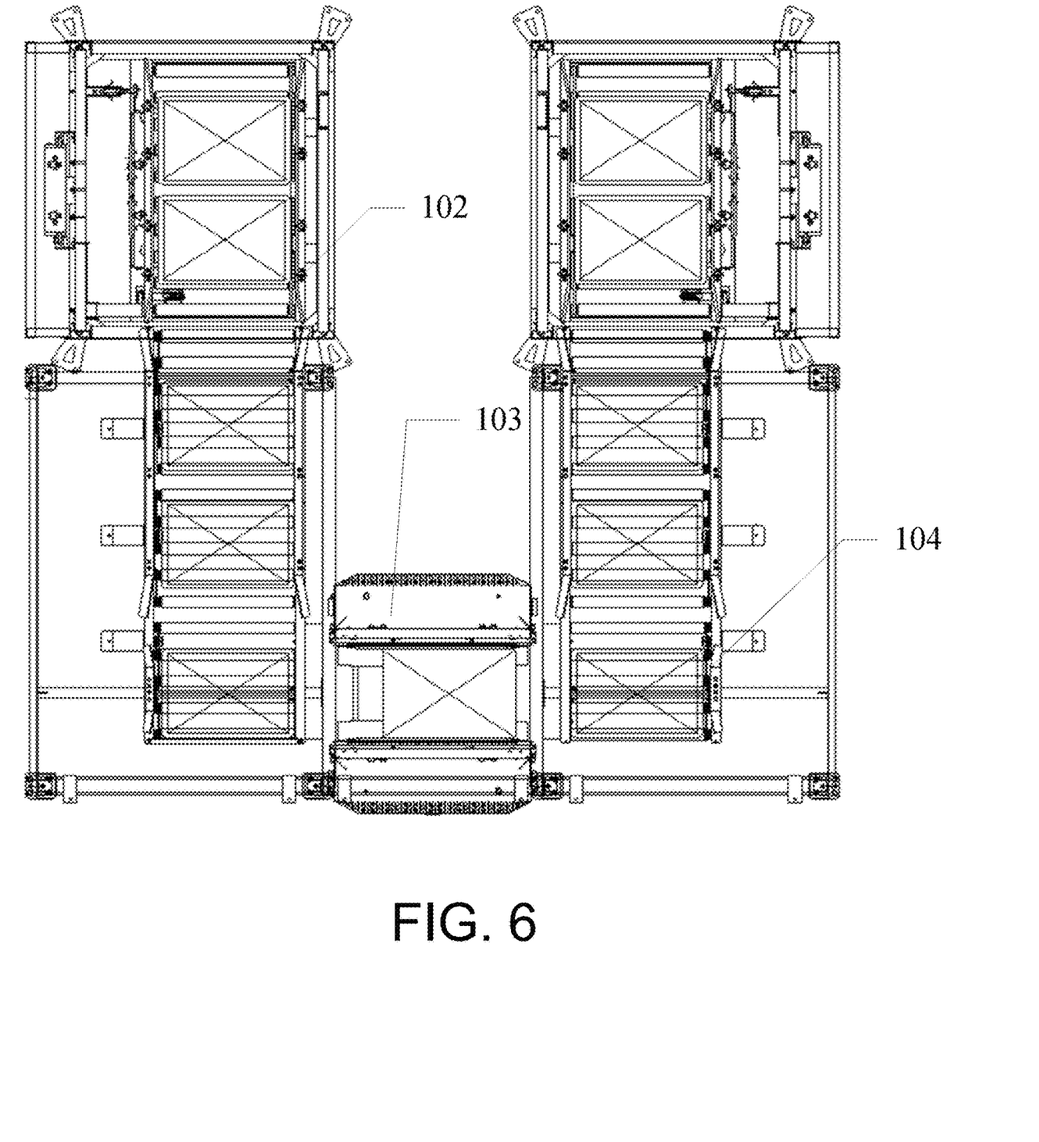
FIG. 6 is another schematic diagram of goods locations of the lifting machines and the power stations in the embodiment of this application.

The power station has at least two turnover box locations, and the lifting machine has at least two turnover box locations. Referring to FIG. 4 which shows a diagram of goods locations of the lifting machines and the power stations, the storage platform of each lifting machine has two rows and one column of turnover box locations, and each power station has two rows and two columns of turnover box locations. Referring to FIG. 5 which shows another diagram of goods locations of the lifting machines and the power stations, the storage platform of each lifting machine has two rows and one column or one row and one column of turnover box locations, each the power station has one row and three columns, or one row and two columns, or one row and one column of turnover box locations. Referring to FIG. 6 which shows another diagram of goods locations of the lifting machines and the power stations, the storage platform of each lifting machine has two rows and two columns of turnover box locations, and each power station has two rows and two columns of turnover box locations. In an actual application, the layout of the goods locations of the lifting machines and the power stations can be determined according to the density of goods to be delivered and stored, the quantity of goods to be cached, and the space occupied by the goods.

The transmission mechanism comprises at least two power sections which respectively correspond to a storage region and a cache region. As shown in FIG. 4, the power station has a storage region 303 and a cache region 304. The power station has a greater capacity to temporarily store goods through the configuration of the cache region 304. When goods are to be delivered, the shuttle vehicle places the goods in the storage region, then the goods are transferred to the cache region by the transmission mechanism, and at this moment, the storage region can receive goods from the shuttle vehicle again without waiting until the lifting machine transfers the goods on the power station away, so that the goods sorting efficiency of the shuttle vehicle is improved. Similarly, when goods are to be stored, the storage region can temporarily store the goods, so that the lifting efficiency of the lifting machine is improved.

The transmission mechanism may consist of a plurality of transmission rollers such as electric rollers. Considering that goods need to be transferred by the shuttle vehicle in a direction perpendicular to the transmission rollers in the storage region, the frictional force between the transmission rollers and order boxes has to be decreased in the storage region to make sure that the fork of the shuttle vehicle can take or place the order boxes conveniently. The frictional force between the transmission rollers and the order boxes has to be increased in the cache region to make sure that the order boxes can be better transferred. Therefore, the transmission rollers in the storage region are smooth transmission rollers, and the transmission rollers in the cache region are coarse transmission rollers. Moreover, the transmission mechanism may consist of a plurality of belts which are respectively arranged in the storage region and the cache region.

The power station further comprises a transition board which is configured to avoid the negative influence of a gap between the power station and the shuttle vehicle on the transfer process of the order boxes between the power station and the shuttle vehicle. The transition board is arranged between the storage region and the rail beam of the shuttle vehicle, so that order boxes can be transferred more smoothly, and the delivery and storage efficiency is guaranteed.

Figure 7:
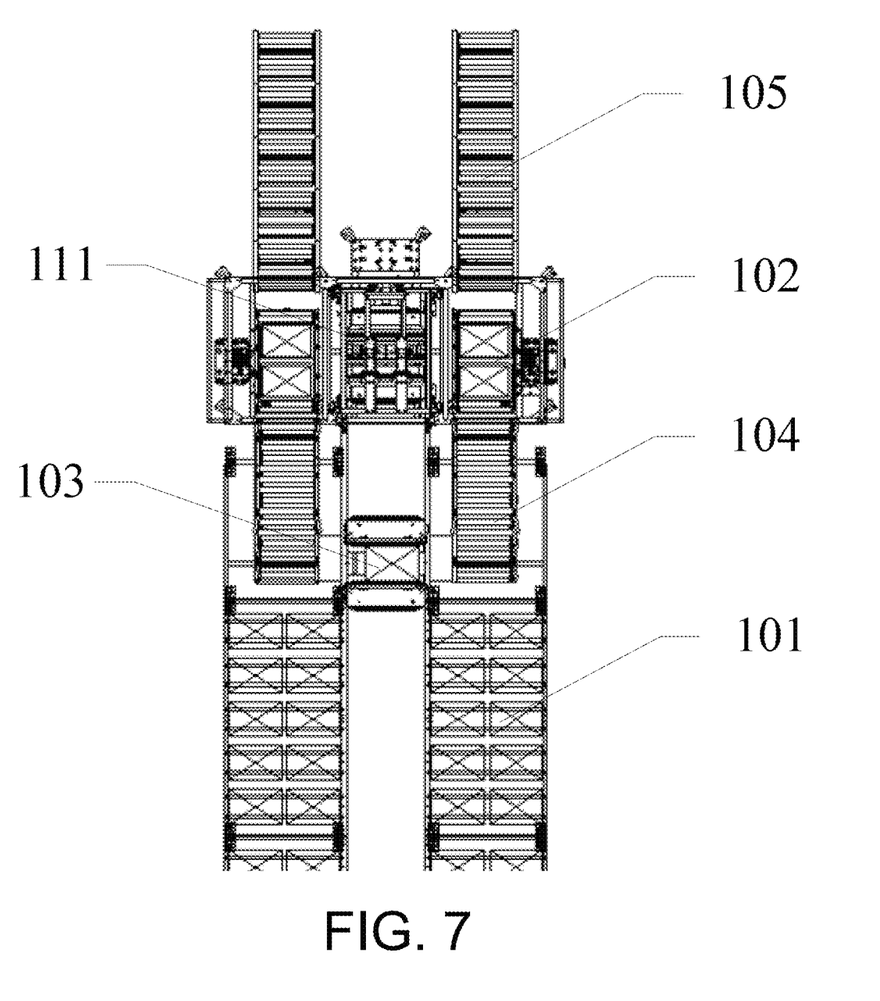
FIG. 7 is an installation diagram of a layer-change lifting machine in the embodiment of this application.
Figure 8:
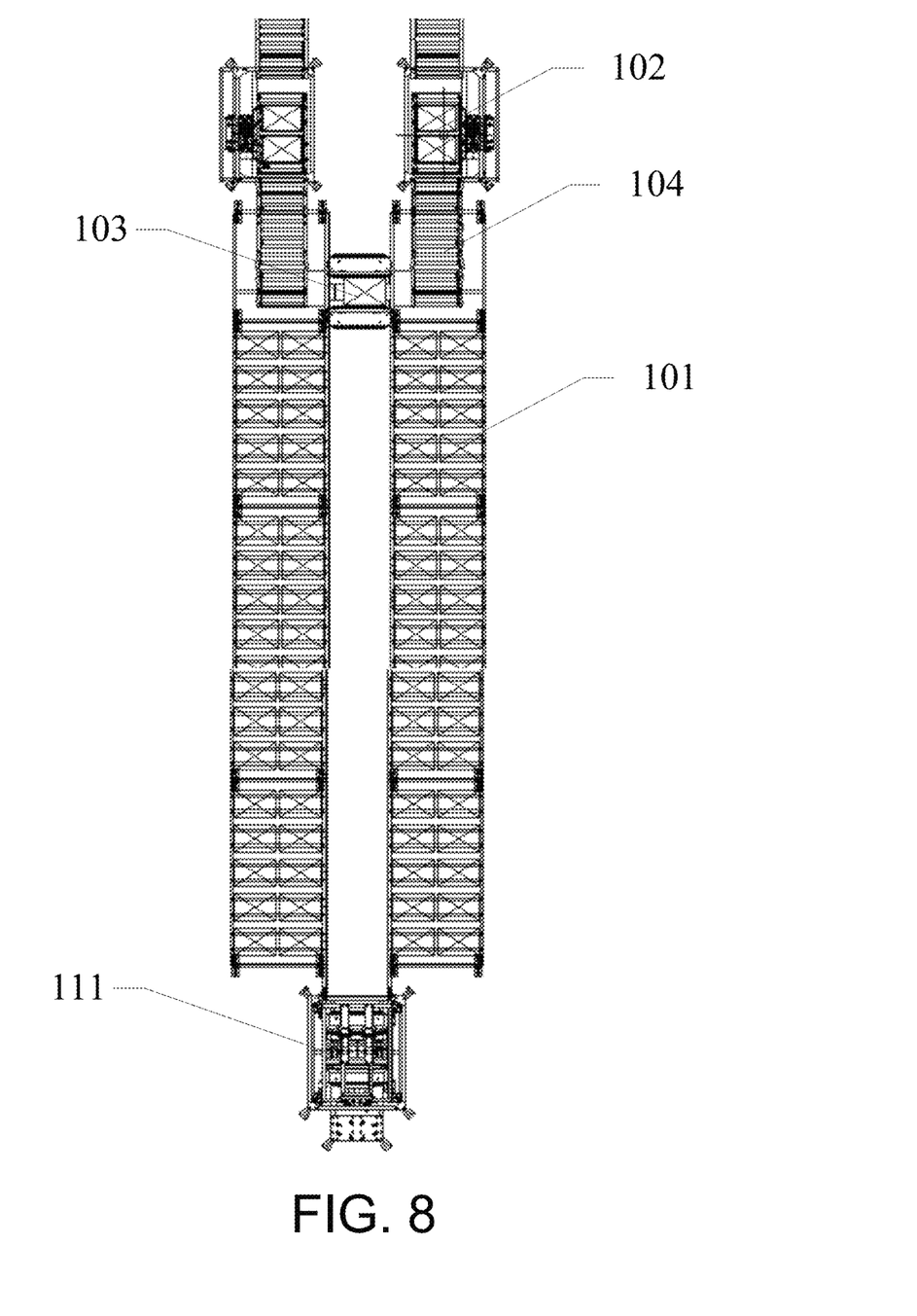
FIG. 8 is another installation diagram of the layer-change lifting machine in the embodiment of this application.
Figure 9:
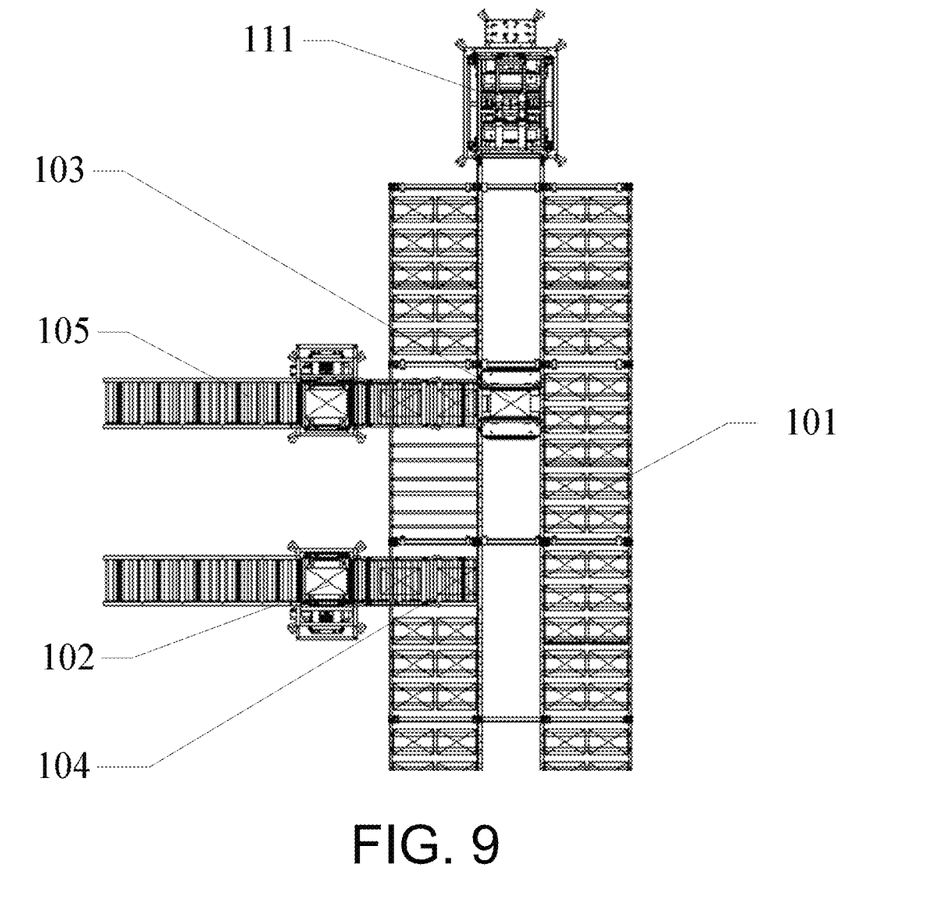
FIG. 9 is another installation diagram of the layer-change lifting machine in the embodiment of this application.

The honeycomb system further comprises a layer-change lifting machine which is arranged at any end of the dual-goods-location shelves. Referring to FIG. 7 and FIG. 8 which show installation diagrams of the later-change lifting machine, the layer-change lifting machine 111 is arranged at an end, provided with the power stations and the lifting machines, of the shelves in FIG. 7, and the layer-change lifting machine is arranged at the other end of the shelves in FIG. 8. The shuttle vehicle can be transferred to any layer of the shelves through the layer-change lifting machine, so that it is not needed to configure one shuttle vehicle on each layer of the shelves. For example, five shuttle vehicles or at least one shuttle vehicle is configured in each roadway of ten layers of shelves, so that the cost of the whole system is effectively reduced. As shown in FIG. 9 which is an installation diagram of the layer-change lifting machine, the power stations and the lifting machines are arranged on a side faces of the shelves, and the layer-change lifting machine is arranged at one end of the shelves.

The honeycomb system further comprises a maintenance device which corresponds to at least one modular storage unit and is used for maintaining the modular storage unit. The maintenance device comprises a multi-layer maintenance platform and a maintenance lifting machine. Referring to FIG. 1 which shows the maintenance lifting machine 110, the multi-layer maintenance platform comprises a first footboard 108 arranged in the roadway and a second footboard 109 arranged at one end of the dual-goods-location shelves, and the maintenance lifting machine 110 is connected to the second footboard 109. Furthermore, the maintenance device further comprises a maintenance staircase.

The honeycomb system in this embodiment of the application comprises at least one modular storage unit which includes a set of dual-goods-location shelves, at least one lifting machine, at least one shutter vehicle and at least one power station. Through the cooperation of the shuttle vehicle, the lifting machine and the power station, the delivery and storage efficiency and storage density of the shelves are improved, an occupied space is saved, and accordingly, the sorting efficiency of the storage shelves is improved.

Embodiment 2

Embodiment 2 of this application provides a honeycomb system which is applied to a sorting and sorting system. The honeycomb system comprises at least one modular storage unit. A plurality of the modular storage units correspond to a sorting apparatus. The modular storage unit comprises a set of dual-goods-location shelves, at least one layer-change lifting machine and at least one shuttle vehicle. The set of dual-goods-location shelves are parallel to one another to form a roadway where the shuttle vehicle operates. The layer-change lifting machine is arranged at any end of the dual-goods-location shelves and is used for lifting the shuttle vehicle to perform goods transfer between the shuttle vehicle and a conveyor line connected to the honeycomb system.

Figure 10:
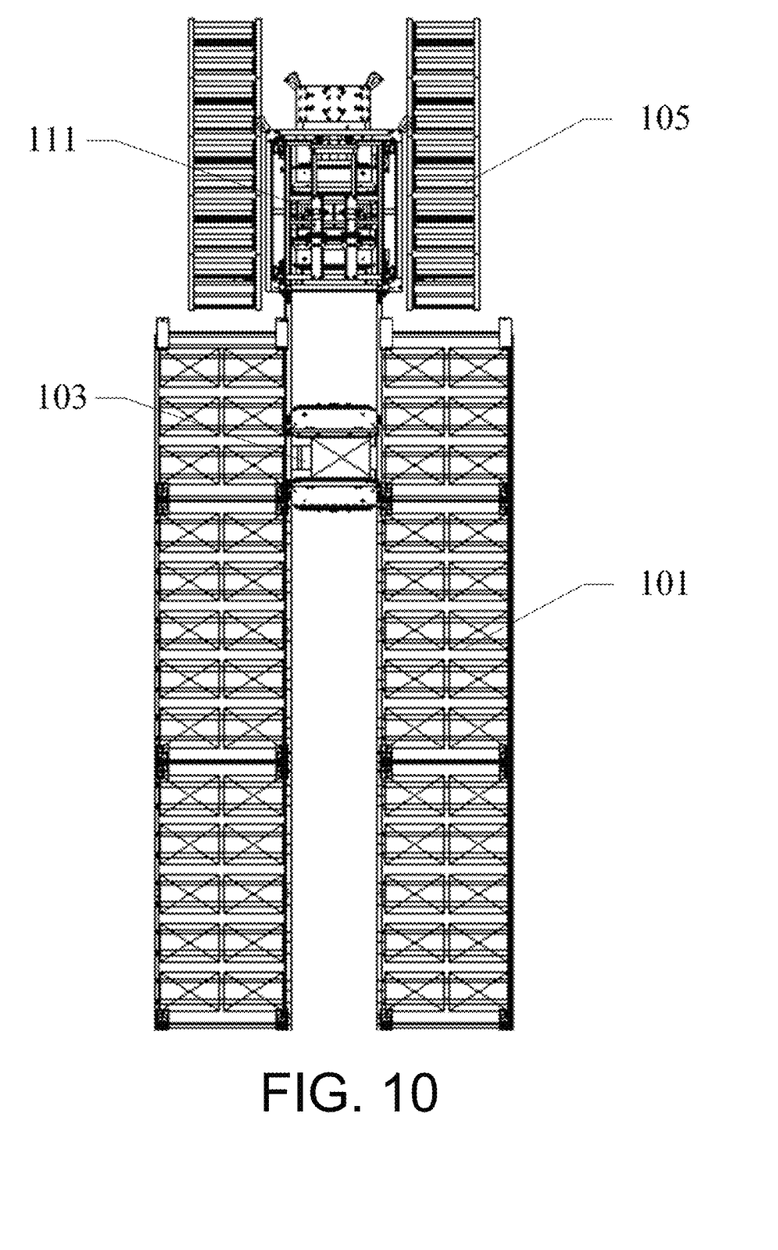
FIG. 10 is another installation diagram of the layer-change lifting machine in the embodiment of this application.

Referring to FIG. 10 which shows a structural diagram of the layer-change lifting machine, compared with Embodiment 1, the layer-change lifting machine is configured, so that the lifting machines and the power stations which are used for lifting material boxes do not need to be configured anymore. When goods are to be delivered, the shuttle vehicle carrying with material boxes enters the layer-change lifting machine from a rail on the shelves, then the layer-change lifting machine descends to the conveyor line, and the shuttle vehicle places the material boxes on the conveyor line. When goods are to be stored, the shuttle vehicle is lifted by the layer-change lifting machine to the corresponding layer of the storage shelves, and then enters the rail on the shelves to place the material boxes at preset positions.

According to the honeycomb system in this embodiment of the application, goods delivery and storage are realized through the layer-change lifting machine and the shuttle vehicle, and the power stations and the lifting machines used for lifting material boxes are not configured, so that the structure is simple, and the cost is low. The delivery and storage efficiency and storage density of the shelves are high, an occupied space is saved, and accordingly, the sorting efficiency of the storage shelves is improved.

Embodiment 3

Figure 11:
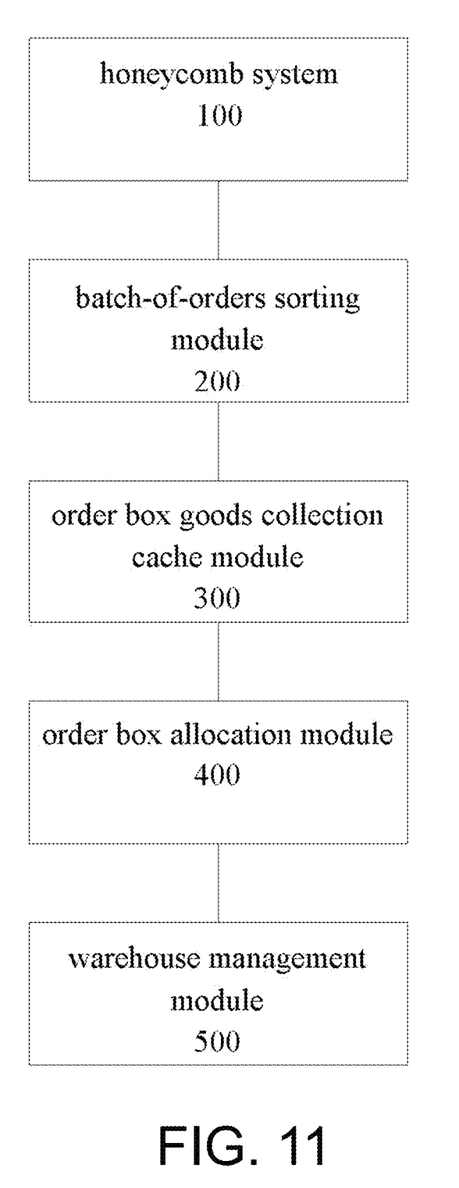
FIG. 11 is a structural block diagram of a material box storage and sorting system in an embodiment of this application.

Embodiment 3 of this application provides a material box storage and sorting system which comprises the honeycomb system provided by Embodiment 1. Referring to FIG. 11 which shows a structural diagram of the material box storage and sorting system, the material box storage and sorting system at least comprises a honeycomb system 100, a batch-of-orders sorting module 200, an order box goods collection cache module 300, an order box allocation module 400 and a warehouse management module 500.

Particularly, the honeycomb system 100 is used to store material boxes. The material boxes are used to store goods. It should be noted that the honeycomb system meets the operating requirements of a shuttle vehicle, a power station, a lifting machine and a maintenance device.

The batch-of-orders sorting module 200 is used to perform parallel sorting of a batch of orders, so as to pick up goods into order boxes from the material boxes. The batch of orders consists of a plurality of orders. Parallel sorting is performed on the orders in the batch of orders, that is, goods information included in the multiple orders is processed to determine the quantity of to-be-picked goods or the sorting sequence. For example, the total quantity of to-be-picked goods of the same type is worked out so that all the goods of this type in the batch of orders can be picked out in the delivery process. Or, to-be-picked goods in this batch of orders are sorted to perform parallel sorting of multiple orders, and in comparison with a traditional serial order sorting method, the sorting speed and efficiency of the batch-of-orders sorting module are improved.

The order box goods collection cache module 300 is used to cache and transfer the order boxes. Compared with a conveyor-line cache method, the order box goods collection cache module of the material box storage and sorting system has a higher storage capacity and can cache much more goods, so that more batch-of-orders sorting modules can be configured to make sure that more sorting stations work in parallel, thus improving the sorting efficiency of the batch of orders.

Furthermore, the order box goods collection cache module 300 may be used to randomly receive and cache order boxes corresponding of multiple batches of orders and to output order boxes corresponding to the same batch of orders in a centralized manner as required. Therefore, under the condition where order boxes corresponding to difference batches of orders enter the order box goods collection cache module, order boxes corresponding to the same batch of orders can be output in a centralized manner and are then supplied to the subsequent order box allocation module 400. Compared with a traditional method, the order box sorting procedure of an allocation conveyor line is omitted (order boxes of the same batch are output, so that sorting does not need to be performed anymore), so that the order box supply efficiency of an allocation platform is improved, and accordingly, the user order completion efficiency is improved.

The order box allocation module 400 is used to receive the order boxes cached and transferred by the order box goods collection cache module and to allocate the order boxes according to information about the user orders, so as to complete goods sorting for the batch of orders.

The warehouse management module 500 is used to receive and process the batch of orders sent from an order system, to deploy the material box storage module to deliver or store the material boxes, to deploy the batch-of-orders sorting module to perform sorting, to deploy the order box goods collection cache module to cache and transfer the order boxes, and to deploy the order box allocation module to allocate the order boxes. Understandably, the warehouse management module 500 may has a function of monitoring and managing the material box storage and sorting system. For example, the warehouse management module 500 can process the information about the batch of orders, deploy equipment to work, monitor the working condition of the equipment, manage the material boxes and goods information, and manage goods location allocation.

The material box storage and sorting system in this embodiment of the application adopts a batch-of-orders parallel sorting method to perform parallel sorting of the same batch of order on multiple sorting stations, thus greatly improving the sorting efficiency. Compared with a traditional conveyor-line cache method, the order box goods collection cache module has a higher storage capacity and can cache much more goods, so that more batch-of-orders sorting modules can be configured to guarantee that more sorting stations work in parallel, thus improving the sorting efficiency of the batch of orders.

Moreover, unless otherwise explicitly stated and defined, the terms "install", "connect", and "connection" in the description of the embodiments of the application should be generally understood. For instance, "connection" may refer to fixed connection, detachable connection or integral connection, or mechanical connector or electrical connection, or direct connection or indirect connection with an inter-medium, or internal communication of two elements. Those ordinarily skilled in the art should appreciate the specific meanings of these terms in this application as the case may be.

It should be noted that the terms such as "central", "upper", "lower", "left", "right", "vertical", "horizontal", "inner" and "outer" in the description of this application are used to indicate positional or relational relations on the basis of the drawings for the purpose of facilitating and simplifying the description of this application, do not indicate or imply that the devices or elements referred to mush have specific directions or must be configured or operated in specific directions, and thus should not be interpreted as limitations of this application. In addition, the terms "first", "second", and "third" are only used for the purpose of description, and do not indicate or imply any relative importance.

Those skilled in the art can thoroughly understand the specific working process of the systems, devices and units mentioned above by referring to the corresponding process in the embodiments of the method, and for the purpose of a convenient and brief description, relevant details will no longer be given.

It should be noted that the systems, devices and methods disclosed in the several embodiments of this application can be implemented in other ways. The device embodiments described above are only illustrative ones. For instance, the units are partitioned merely according to logic functions, and when actually implemented, the units can also be partitioned in other ways. For example, multiple units or assemblies can be combined or integrated in another system, or certain characteristics can be neglected or not executed. Moreover, coupling or direct coupling or communication illustrated or discussed above may refer to indirect coupling or communication between devices or units via communication interfaces, or electrical or mechanical coupling or communication, or coupling or communication in other ways.

The units which are independently stated may be or may not be physically separated, and components which are shown as units may be or may not be physical units, that is, these components may be located at the same position or may be distributed in multiple network units. The part or all of these units can be selected as actually needed to fulfill the purpose of the embodiments.

In addition, all functional units in the embodiments of this application may be integrated in one processing unit or separated physically, or two or more units may be integrated in one unit.

Finally, it should be noted that the above embodiments of this application are only specific ones used to explain the technical solutions of this application, and are not intended to limit the technical solutions. The protection scope of this application is not limited to the above embodiments. Although this application has been expounded with reference to the aforesaid embodiments, those ordinarily skilled in the art would appreciate that any skilled in the art can make modifications or achievable alterations to the technical solutions recoded in the aforesaid embodiments or make equivalent substitutions to part of the technical characteristics within the technical scope disclosed by this application. All these modifications, alterations or substitutions obtained without making the corresponding technical solutions deviate from the spirit and scope of the technical solutions of this application should also fall within the protection scope of this application. Thus, the protection scope of this application should be subject to the protection scope of the claims.

INDUSTRIAL APPLICABILITY

The honeycomb system provided by the embodiments of this application can improve the delivery and storage efficiency and storage density of shelves, save an occupied space and improve the sorting efficiency of the storage shelves.

What is claimed is:
1. A honeycomb system, applied to a storage and sorting system, the honeycomb system comprising at least one modular storage unit that corresponds to a sorting apparatus, wherein the modular storage unit comprises a set of dual-goods-location shelves, at least one lifting machine, at least one shuttle vehicle and at least one power station, the dual-goods-location shelves are parallel to each other to form a roadway where the shuttle vehicle operates therein, the power station is arranged at an end or in a middle portion of the dual-goods-location shelves and is integrated with a transmission mechanism and a support frame; and the transmission mechanism is connected to the shuttle vehicle and the lifting machine to perform goods transfer between the shuttle vehicle and the lifting machine.

2. The honeycomb system according to claim 1, wherein the shuttle vehicle is a bidirectional-stretching and single-goods-location shuttle vehicle or a bidirectional-stretching and dual-goods-location shuttle vehicle; the bidirectional-stretching and single-goods-location shuttle vehicle comprises a single-goods-location storage platform and a fork; the bidirectional-stretching and dual-goods-location shuttle vehicle comprises a dual-goods-location storage platform and a fork; and the forks are bidirectional-stretching forks.

3. The honeycomb system according to claim 1, further comprising a layer-change lifting machine which is arranged at any end of the dual-goods-location shelves.

4. The honeycomb system according to claim 1, wherein the power station has a storage region and a cache region; and the transmission mechanism comprises a plurality of transmission rollers or a plurality of belts, the transmission rollers in the storage region are smooth transmission rollers, and the transmission rollers in the cache region are coarse transmission rollers.

5. The honeycomb system according to claim 4, wherein the power station is spaced apart from the shuttle vehicle.

6. The honeycomb system according to claim 5, wherein the power station further has a transition board which is arranged between the storage region and a rail beam of the shuttle vehicle.

7. The honeycomb system according to claim 1, wherein the dual-goods-location shelves are intensive multi-layer shuttle vehicle shelves having a plurality of goods locations at each shelf layer;

the dual-goods-location shelf comprises at least one column sheet, a plurality of material box support pieces, a rail beam and a rear beam;

the rail beam is configured to support the shuttle vehicle to travel thereon;

the rail beam and the rear beam are respectively arranged at two ends of the material box support pieces;

the material box support pieces are arranged in parallel to form one shelf layer together with the rail beam and the rear beam; and the intensive multi-layer shuttle vehicle shelf includes a plurality of the shelf layers.

8. The honeycomb system according to claim 7, wherein an order box is disposed on every two of the material box support pieces; and the honeycomb system further comprises a storage lifting machine and a delivery lifting machine, and the storage lifting machine and the delivery lifting machine are respectively arranged at two ends of a storage and picking shelf of the order box.

9. The honeycomb system according to claim 7, wherein the material box support pieces are material box support rods, material box support nets, or material box support plates.

10. The honeycomb system according to claim 1, further comprising a maintenance device corresponding to the modular storage unit.

11. The honeycomb system according to claim 10, wherein the maintenance device comprises a multi-layer maintenance platform and a maintenance lifting machine;

the multi-layer maintenance platform comprises a first footboard arranged in the roadway and a second footboard arranged at one end of the dual-goods-location shelves; and the maintenance lifting machine is connected to the second footboard.

12. The honeycomb system according to claim 1, comprising a code scanner which is configured to scan bar code information of bar code labels arranged on the dual-goods-location shelves.

13. The honeycomb system according to claim 1, wherein the power station has at least two turnover box locations, and the lifting machine has at least two turnover box locations.

14. A honeycomb system, applied to a storage and sorting system, the honeycomb system comprising at least one modular storage unit that corresponds to a sorting apparatus, wherein the modular storage unit comprises a set of dual-goods-location shelves, at least one layer-change lifting machine and at least one shuttle vehicle, the dual-goods-location shelves are parallel to each other to form a roadway where the shuttle vehicle operates therein, the layer-change lifting machine is arranged at any end of the dual-goods-location shelves and is configured to lift the shuttle device to perform goods transfer between the shuttle vehicle and a conveyor line connected to the honeycomb system.

15. A material box storage and sorting system, comprising the honeycomb system according to claim 1, a batch-of-orders sorting module, an order box goods collection cache module, an order box allocation module and a warehouse management module, wherein the batch-of-orders sorting module is configured to perform parallel sorting of a batch of orders, so as to pick up goods into order boxes from the honeycomb system, and the batch of orders consists of a plurality of user orders;

the order box goods collection cache module is used to cache and transfer the order boxes;

the order box allocation module is used to receive the order boxes cached and transferred by the order box goods collection cache module and to allocate the order boxes according to information of the user orders, so as to complete goods sorting for the batch of orders; and the warehouse management module is configured to receive and process the batch of orders sent from an order system, to deploy the honeycomb system to deliver or store material boxes, to deploy the batch-of-orders sorting module to perform sorting, to deploy the order box goods collection cache module to cache and transfer the order boxes, and to deploy the order box allocation module to allocate the order boxes.

* * * * *